(12) United States Patent
Onorato et al.

(10) Patent No.: US 10,318,284 B2
(45) Date of Patent: Jun. 11, 2019

(54) SYSTEM AND METHOD OF GENERATING AND MANAGING COMPUTING TASKS

(75) Inventors: Brandt William Onorato, Keene, NH (US); Stephen Donald Seifert, Marshall, MI (US); Anthony T. Lee, Sunnyvale, CA (US); Ray Kemmer Green, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 1773 days.

(21) Appl. No.: 12/131,422

(22) Filed: Jun. 2, 2008

(65) Prior Publication Data

US 2009/0300617 A1    Dec. 3, 2009

(51) Int. Cl.
    *G06F 8/71*    (2018.01)

(52) U.S. Cl.
    CPC ...................... *G06F 8/71* (2013.01)

(58) Field of Classification Search
    CPC .......................................... G06F 8/71
    USPC ........................................ 718/100
    See application file for complete search history.

(56) References Cited

U.S. PATENT DOCUMENTS

| | | | | |
|---|---|---|---|---|
| 5,574,898 A * | 11/1996 | Leblang | ............... | G06F 11/3476 |
| 5,649,200 A * | 7/1997 | Leblang et al. | ............... | 717/122 |
| 5,872,977 A * | 2/1999 | Thompson | ..................... | 717/122 |
| 6,202,199 B1 * | 3/2001 | Wygodny | ........... | G06F 11/3636 |
| | | | | 702/183 |
| 6,546,413 B1 * | 4/2003 | Northrup | ...................... | 709/200 |
| 6,557,100 B1 * | 4/2003 | Knutson | .................... | G06F 8/60 |
| | | | | 707/999.201 |
| 6,862,563 B1 * | 3/2005 | Hakewill | ............ | G06F 9/30145 |
| | | | | 703/13 |
| 7,203,938 B2 | 4/2007 | Ambrose et al. | | |
| 7,577,953 B1 * | 8/2009 | Verego et al. | ................. | 718/100 |
| 7,950,000 B2 * | 5/2011 | Kipman et al. | ................ | 717/121 |
| 2002/0161734 A1 | 10/2002 | Stauber et al. | | |
| 2003/0088854 A1 * | 5/2003 | Wygodny | ............ | G06F 11/3636 |
| | | | | 717/130 |
| 2004/0123268 A1 | 6/2004 | Lundberg et al. | | |
| 2004/0261053 A1 * | 12/2004 | Dougherty | ................ | G06F 8/20 |
| | | | | 717/101 |
| 2005/0086579 A1 * | 4/2005 | Leitner | .................. | G06Q 30/02 |
| | | | | 715/229 |
| 2006/0010425 A1 | 1/2006 | Willadsen et al. | | |
| 2006/0080638 A1 * | 4/2006 | Fiore | ......................... | G06F 8/71 |
| | | | | 717/104 |
| 2008/0016490 A1 * | 1/2008 | Pabalate | ................ | G06Q 10/10 |
| | | | | 717/101 |

(Continued)

OTHER PUBLICATIONS

"Multithreading", author unknown. May 7, 2001. 21 pages. Obtained via http://www.ccs.neu.edu/course/com3118/Multithreading.html.*

*Primary Examiner* — George Giroux
(74) *Attorney, Agent, or Firm* — Brian J. Colandreo, Esq.; Jeffrey T. Placker, Esq.; Holland & Knight LLP

(57) ABSTRACT

A method, computer program product, and system of managing computing tasks includes storing at least one build information element within at least one attribute of a configuration management tool A computing task is generated from within the configuration management tool based upon, at least in part, the at least one build information element. The computing task is initiated from within the configuration management tool. The computing task is deployed on a computing device.

10 Claims, 2 Drawing Sheets

(56) References Cited

U.S. PATENT DOCUMENTS

| | | | | |
|---|---|---|---|---|
| 2008/0120400 A1* | 5/2008 | Keller | .................... | G06Q 10/06 709/223 |
| 2009/0157800 A1* | 6/2009 | Cheng | .................... | G06F 9/548 709/203 |
| 2009/0204945 A1* | 8/2009 | Jain | ....................... | G06F 11/368 717/124 |

* cited by examiner

US 10,318,284 B2

SYSTEM AND METHOD OF GENERATING AND MANAGING COMPUTING TASKS

TECHNICAL FIELD

This disclosure relates to the generation and management of computing tasks, and, more particularly, to the generation and management of computing tasks from within a configuration management tool.

BACKGROUND

A build process may be the process by which an individual and/or an organization builds, compiles, and deploys software. The build process for many computer systems is a manual process. In particular, the process of developing, deploying, and executing mainframe computer jobs is a manual, burdensome process. Developers must manually determine how to build, compile, and deploy their work within the development environment. Additionally, developers must be aware of and manage build/compile components for each individual source file within a project. The manual development process, especially a mainframe development process, is costly and inefficient. Development resources that could be directed toward software development are consumed by management of the build, compilation, and deployment processes.

A data driven approach to automating the build and deployment processes that utilizes functionality of a configuration management tool may alleviate the burden placed on developers who must manage the build and deployment process. This data driven approach may also increase efficiency by bridging the gap between PC based development tools and various development models, including development models that include mainframe-based build cycles.

SUMMARY OF DISCLOSURE

According to a first implementation, a method of managing computing tasks includes storing at least one build information element within at least one attribute of a configuration management tool. A computing task is generated from within the configuration management tool based upon, at least in part, upon the at least one build information element. The computing task is initiated from within the configuration management tool. The computing task is deployed on a computing device.

One or more of the following features may be included. The computing task may be executed on the computing device. The computing task may be generated based upon, at least in part, the at least one build information element by initiating a script that is operative to perform operations including one or more of using the at least one build information element to generate the computing task; initiating the computing task; and executing the computing task on the computing device. The at least one build information element may include one or more of build parameters; software code; script code; flags; deployment parameters; meta-data; and build commands. The at least one attribute may include one or more of a project level attribute; an element level attribute; an environment variable level attribute; and a global level attribute. The computing device may include a mainframe computer. The computing task may include build control language. The computing task may include a multi-platform computing task. Generating the computing task may include generating at least one task for each platform of the multi-platform computing task. The method of managing computing tasks may include managing a version of the at least one build information element via the configuration management tool.

According to a second implementation, a computer program product residing on a computer readable medium has a plurality of instructions stored thereon, which, when executed by a processor, cause the processor to perform operations including: storing at least one build information element within at least one attribute of a configuration management tool; generating a computing task from within the configuration management tool based, at least in part, upon the at least one build information element; initiating the computer task from within the configuration management tool; and deploying the computing task on a computing device.

One or more of the following features may be included. The computing task may be executed on the computing device. The computing task may be generated based upon, at least in part, the at least one build information element by initiating a script that is operative to perform operations including one or more of using the at least one build information element to generate the computing task; initiating the computing task; and executing the computing task on the computing device. The at least one build information element may include one or more of build parameters; software code; script code; flags; deployment parameters; meta-data; and build commands. The at least one attribute may include one or more of a project level attribute; an element level attribute; an environment variable level attribute; and a global level attribute. The computing device may include a mainframe computer. The computing task may include build control language. The computing task may include a multi-platform computing task. Generating the computing task may include generating at least one task for each platform of the multi-platform computing task. The method of managing computing tasks may include managing a version of the at least one build information element via the configuration management tool.

BRIEF DESCRIPTION OF THE DRAWINGS

Like reference symbols in the various drawings denote like elements.

DETAILED DESCRIPTION OF THE PREFERRED EMBODIMENTS

Figure 1:
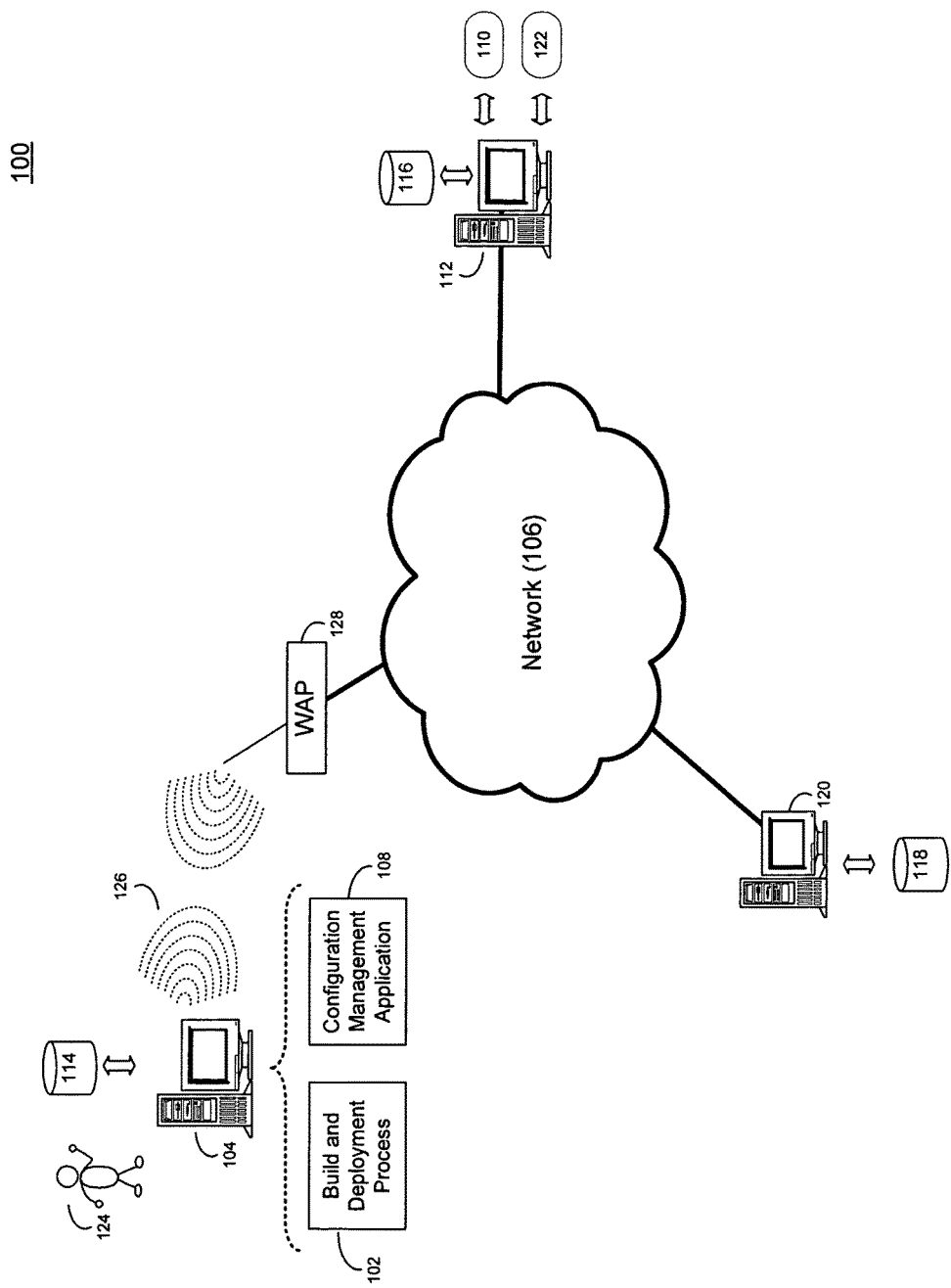
FIG. 1 diagrammatically depicts a system and architecture view of a build and deployment process coupled to a distributed computing network

System Overview:

Referring to FIG. 1, there is shown build and deployment architecture 100 and build and deployment process 102. As will be discussed below in greater detail, build and deployment process 102 may store at least one build information element within a configuration management tool. Build and deployment process 102 may also generate a computing task from within the configuration management tool based upon, at least in part, the at least one build information element. Additionally, build and deployment process 102 may initiate and deploy the computing task from within the configuration management tool.

The above-described build and deployment process (e.g., build and deployment process 102) may be a client-side build and deployment process (e.g., client-side build and deployment process 102), a server-side build and deployment process (not shown) or a hybrid server-side/client-side build and deployment process (e.g., the combination of client-side build and deployment process 102 and one or more server-side build and deployment processes).

Build and deployment process 102 may reside on and may be executed by client computer 104, which may be connected to network 106 (e.g., the Internet or a local area network). Examples of client computer 104 may include, but are not limited to: a personal computer, a server computer, a series of server computers, a mini computer, a mainframe computer, a terminal, a laptop computer, a notebook computer, and a tablet computer. Client computer 104 may run a network operating system, such as Microsoft XP™, OS/2™, or Ubuntu Linux™. Client computer 104 may also be a terminal computer without a resident operating system. Various and multiple computer applications may run on client computer 104. For example, in addition to build and deployment process 102, client computer 104 may also run a configuration management application, such as configuration management application 108. Examples of configuration management application 108 may include, but are not limited to: the ClearCase™, Visual Source Safe™, CVS™, and CM Synergy™ configuration management tools.

Build and deployment process 102 may be a stand alone build and deployment application or an applet/application that is executed within a build and deployment application (not shown), examples of which may include, but are not limited to: BuildForge™, Visual Studio™, or a custom deployment application. Configuration management application 108 may be a stand alone application and may provide configuration management services locally. Configuration management application 108 may also be a client-side application that may accesses remote configuration management services. For example, configuration management application 108 may access configuration management services 110 provided by server computer 112.

The instruction sets and subroutines of various applications and processes, including build and deployment process 102, configuration management application 108, and configuration management service 110 may reside on a computer readable medium that may be coupled to a computing device. For example, the instruction sets and subroutines of build and deployment process 102 and configuration management application 108 may reside on computer readable medium 114 coupled to client computer 104, configuration management service 110 may reside on computer readable medium 116 coupled to server computer 112. Similarly, one or more of the build and deployment process, the configuration management application, and the configuration management service may reside on computer readable medium 118 coupled to target computer 120. Computer readable media 114, 116, 118 may be any type of computer readable media including, but not limited to: a hard disk drive, a solid state drive, an array of hard drives, an optical disc, a read-only memory, a random access memory, a flash memory, and a tape drive.

Server computer 112 may be a server (or a series of servers) running a network operating system, examples of which may include but are not limited to: Microsoft Windows 2003 Server™; Novell Netware™; or Redhat Linux™, for example. Server computer 114 may also execute at least one server application and/or provide at least one server service. For example, server computer 112 may provide a database service, such as database service 122 and/or configuration management service 110. Database service 122 may provide database services through a database application including, but not limited to: an Oracle™ database application, a SQL™ database application, and/or a custom database application. Similarly, configuration management service 110 may provide configuration management services through a configuration management application including, but not limited to: CVS™ configuration management, Perforce™ configuration management, and/or ClearCase™ configuration management. Server computer 112 may execute a web server application, examples of which may include but are not limited to: the Microsoft IIS™, Novell Webserver™, or Apache™ Webserver, that allows for HTTP (i.e., HyperText Transfer Protocol) access to server computer 112 via network 106. In general, server services running on server computer 112, such as database service 122 and configuration management service 110, may be available via a network, such as computer network 106.

The instruction sets and subroutines of build and deployment process 102, which may be stored on computer readable medium 114 coupled to client computer 104, may be executed by one or more processors (not shown) and one or more memory architectures (not shown) incorporated into client computer 104. As mentioned above, computer readable medium 114 may include but is not limited to: a hard disk drive; a solid state drive; a tape drive; an optical drive; a RAID array; a random access memory (RAM); and a read-only memory (ROM), and a flash memory device.

Network 106 may be a local network or a wide area network. For example, network 106 may be a local area network, a wide area network, and intranet, an internet, or any form of network. Additionally, network 106 may include multiple networks and multiple types of networks. For example, network 106 may include all the interconnected networks that are necessary to connect one or more computing devices, i.e., network 106 may include multiple local area networks, and/or multiple wide area networks, and/or multiple intranets, and/or multiple internets in varied and various connection configurations.

User 124 may access the client computer directly through the device on which the build and deployment process (e.g., build and deployment process 102) is executed, namely client computer 104, for example. User 124 may also access one or more of client computer 104, server computer 112, or target computer 120 through network 106.

Various electronic devices may be directly or indirectly coupled to network 106. For example, target computer 120 is shown directly coupled to network via a hardwired network connection. Further, server computer 112 is also shown directly coupled to network via a hardwired network connection. Client computer 104 is shown wirelessly coupled to network via wireless communication channel 126 established between client computer 104 and wireless access point 128 (i.e., WAP 128), which is shown directly coupled to network 106. WAP 128 may be, for example, an IEEE 802.11a, 802.11b, 802.11g, Wi-Fi, and/or Bluetooth device that is capable of establishing wireless communication channel between client computer 104 and WAP 128.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Build and Deployment Process:

While the above-described build and deployment process may be implemented as a server-side build and deployment process, a client-side build and deployment process, or a hybrid server-side/client-side build and deployment process, for illustrative purposes, the following discussion will relate to the client-side build and deployment process (e.g., build and deployment process 102 residing on client computer 104). However, this should not be construed as a limitation of the present disclosure as other configurations (e.g., a server-side build and deployment process, or a hybrid server-side/client-side build and deployment process) are possible and are considered to be within the scope of this disclosure.

Figure 2:
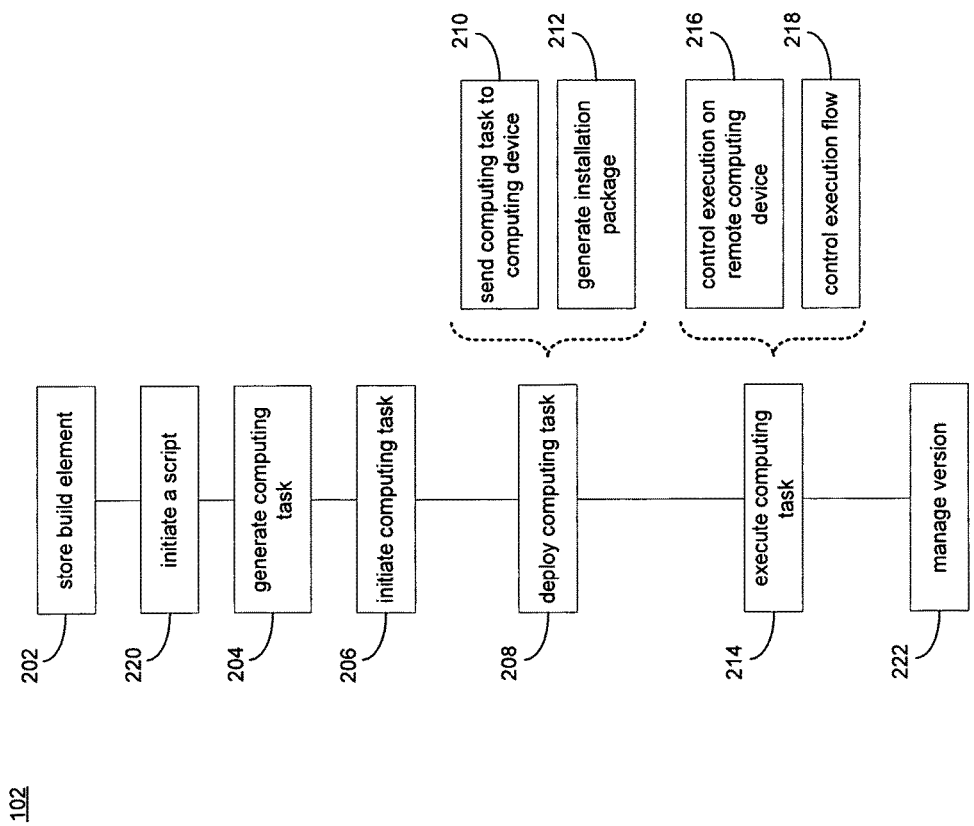
FIG. 2 is a flowchart of a process performed by the build and deployment process of FIG. 1.

Referring also to FIG. 2 build and deployment process 102 may store 202 at least one build information element within at least one attribute of a configuration management tool. Build and deployment process 102 may further generate 204 a computing task from within the configuration management tool based upon, at least in part, the at least one build information element. The computing task may initiate 206 the computing task from within the configuration management tool. The computing task may be deployed 208 on a computing device. For example, build and deployment process 102 may store 202 build information within attributes and elements of a configuration management tool, such as configuration management application 108 and/or configuration management service 110.

A build process may be the process by which an individual and/or an organization builds, compiles, and deploys software. The configuration management tool (e.g., configuration management application 108 and/or configuration management service 110) may provide methods of managing and storing the configurations and revisions of files and information associated with a build process. For example, as mentioned above, configuration management application 108 may be a commercial configuration management tool, i.e., the ClearCase™ tool or the Perforce™ tool. Additionally, configuration management application 108 may allow a user, such as user 124, to add, remove, and/or modify elements and attributes within configuration management application 108. User 124 may, for example, add a source file to configuration management application 108. As another example, user 124 may create a new version of a DLL file within configuration management application 108. Additionally, user 124 may add, remove, or modify ancillary information associated with an element within configuration management application 108, i.e., user 124 may add a comment to an element, modify a documentation associated with an element, or delete a parameter of an element, and/or modify a variable associated with the configuration management tool, for example.

User 124 may also store 202 at least one build information element within a configuration management tool. A build element may describe an aspect of a build process. For example, a build information element may contain information about a compiler that may be used to perform a build. As another example, a build information element may contain information relating to build options or build parameters that may be used to perform a build. A build information element may also contain information about libraries that may be included in a build, files that may be included in a build, global parameters that may be included in a build, and/or steps that may be performed in a build. Additionally, a build information element may contain software code, such as job control language ("JCL"), build control language ("BCL"), C, C++, C#, Java™ code, Perl, and/or any type of code. In general, a build information element may contain any information associated with a build or build process.

The at least one build information element stored 202 within the configuration management tool may take various forms. For example, a build information element may include one or more of build parameters; software code; script code; flags; deployment parameters; meta-data; and build commands. A build parameter may be a build option, a build attribute, or any information associated with the compilation and/or building of a computing task. For example, a build parameter may be an option that may direct a compiler to include debugging information in the output of the compiler. A build parameter may also contain information about whether to include or exclude an assembly step as part of the compilation process. A build information element may also contain software code and/or script code. For example, when build and deployment process 102 generates 204 a computing task, build and deployment process 102 may include within the software task any software code and/or script code that is stored 202 as build information elements within at least one attribute of the configuration management tool.

A build information element may also be a flag, for example a compilation flag that may instruct the compiler to perform (or omit) a particular task. A flag may also be a software flag that may be included within software code that may be generated and/or compiled by build and deployment process 102. A build information element may also be a deployment parameter that may contain information, instructions, flags, etc., that may be used during deployment 208 of the computing task. A build information element may also be meta-data (e.g., data that describes and/or distinguishes other data) or build commands, such as a command to execute a compiler. In general, a build information element may contain any information necessary to facilitate the generation 204 of the computing task.

The build information element(s) within the configuration tool may be stored 202 within attributes of a configuration management tool, such as configuration management application 108 and/or configuration management service 110. Attributes of a configuration management tool may be configuration elements, such as files and/or file revisions, for example. Attributes of a configuration management tool may also be variables within the configuration management tool, such as variables, global variables, or other information that may be stored within a configuration management tool. For example, the ClearCase™ configuration management tool may allow a user to store, revise, and keep revisions of a file. A user, such as user 124, may also store 202 build information elements within the file. Additionally, the ClearCase™ configuration management tool may allow user 124 to store additional information within the ClearCase™ configuration management environment, such as variable values, or other information. Again, user 124 may be able to store 202 at least one build information element as variables or other information within the ClearCase™ configuration management environment. Although ClearCase™ is used as an example, one skilled in the art will recognize that any configuration management tool may be used.

The build information elements may be stored 202 within attributes of a configuration management tool, such as configuration management application 108 and/or configuration management service 110. The attributes may include one or more of a project level attribute; an element level attribute; an environment variable level attribute; and a global level attribute. A project level attribute may be an attribute, such as a variable or other attribute, associated with a project of the configuration management tool. An environment variable level attribute may be an attribute or element associated with the computing environment. For example, an environment variable level attribute may be an environment variable of the operating system running on client computer 104 or server computer 112. A global level attribute may be a global variable within the configuration management tool. The scope of a global level attribute may be a global scope within the configuration management tool and/or within the development environment. The global level attribute may, for example, affect all projects within the configuration management tool whereas a project level attribute may affect only one or more projects within the configuration management tool.

As stated above, build and deployment process 102 may generate 204 a computing task within the configuration management tool based upon, at least in part, the at least one stored 202 build information element. The one or more build information elements stored 202 within the configuration management tool may contain information that may allow build and deployment process 102 to generate 204 a computing task. For example, build and deployment process 102 may access the build information elements stored 202 within the configuration management tool and may use the build information elements to generate 204 a computing task. Unlike a standard build process, build and deployment process 102 may generate 204 the computing task from within the configuration management tool. That is, build and deployment process 102 (alone or in conjunction with the configuration management tool, e.g., provided by one or more of configuration management application 108 and/or configuration management service 110) may contain all the information and intelligence necessary to generate 204 the computing task. The computing task may be an application, a mainframe job, a batch job, or any form of computing task.

Build and deployment process 102 may also initiate 206 a computing task from within the configuration management tool. Build and deployment process 102 may, for example, send 210 the computing task to a computing device, such as target computer 120. Target computer 120 may be a computer of the type and configuration to accept the computing task. For example, if the computer task is an application, target computer 120 may be a personal computer; if the computing task is a mainframe, the computing task may be a JCL or BCL task. A build control language ("BCL") task may be similar to a job control language ("JCL") task, for example. When build and deployment process 102 initiates 206 a computing task from within the configuration management tool, build and deployment process 102 may, in general, process the computing task, which may include preparing the computing task for execution.

Build and deployment process 102 may deploy 208 a computing task on a computing device. Deployment 208 of the computing task may be a permanent or semi-permanent installation on one or more target devices, such as target computer 120. Deployment 208 may also include generating 212 an installation package that may be used to install the computing task on one or more target devices.

Build and deployment process 102 may include a user interface to provide a user, such as user 124, with a visual representation and interface of the features and functions of build and deployment process 102. Alternatively, build and deployment process 102 may be a computer service sans a user interface, or may include only a text-based interface. Build and deployment process 102 may also be a process that borrows and/or adds to the user interface of another application. For example, build and deployment process 102 may include a button, menu item, or other element that is displayed as part of the user interface of configuration management application 108, for example.

Build and deployment process 102 (alone or in conjunction with the configuration management tool, e.g., provided by one or more of configuration management application 108 and/or configuration management service 110) may execute 214 the computing task on the computing device. For example, build and deployment process 102 may initiate 206 a computing task by, for example, sending 210 the computer task to a computer device for execution. Build and deployment process 102 may also execute 214 the computing task. Executing 214 the computing task may include executing 214 the computing task on a local machine, such as client computer 104, or controlling 216 execution on a remote machine, such as target machine 120. Executing 214 the computing task may also include controlling 218 the flow of execution 214. For example, build and deployment process 102 may execute 214 the computing task without any breaks, may break the execution of the computing task, may pause the execution of the computing task, and/or may set the priority of the execution of the computing task, etc., thereby controlling 218 the flow of execution 214.

In one embodiment, the computing device may be a mainframe computer. For example, target computer 120 may be a mainframe computer. Target computer 120 may also be running a mainframe operating system such as z/OS™. Additionally, in the case where target computer 120 is a mainframe computer, the computing task may include build control language. Build control language may be a scripting language that runs on mainframe computers and may instruct the mainframe computer how to run a batch job or start a subsystem, for example. Build control language may be similar to job control language, which is a mainframe scripting language that is known in the art.

The computing task may be able to run on multiple platforms. As such, the computing task may be a multi-platform computing task. For example, the computing task may be targeted toward a mainframe, such as an IBM™ mainframe, or may be targeted toward a personal computer. Additionally, build and deployment process 102 may generate 204 at least one task for each platform of the multi-platform computing task. A single computing task may not be able to run on all platforms. For example, a script may run on an IBM™ mainframe computer, but may not also run on a personal computer or Macintosh™ computer. Accordingly, build and deployment process 102 may generate a task for each platform targeted by the multi-platform computing task. In such an example, the build information elements within the configuration management tool may contain information that may allow build and deployment process 102 to generate 204 computing tasks for each of the platforms that may be targeted by the multi-platform computing task.

In order to generate 204 the computing task, build and deployment process 102 may initiate 220 (e.g., may create) a script that may generate 204 the computing task. The script may, for example, read the one or more build information elements stored 202 within a configuration management tool (e.g., provided by one or more of configuration management application 108 and/or configuration management service 110) and may use the one or more build information elements to generate 204 a computing task based upon, at least in part, the one or more build information elements. As stated, a computing task may be an application, a JCL task, a BCL task, or any other computing task. Similarly, the script may be any type of script including: an application, a perl script, a Java™ script, etc. The script initiated 220 (e.g., created) by build and deployment process 102 may also initiate 206 the computing task on a target device, such as target computer 120. The script may also deploy 208 the computing task on one or more target devices, such as target computer 120. Further, the script initiated 220 by build and deployment process 102 may execute 214 and/or control the execution 214 of the computing task on the target device (e.g., target computer 120). Build and deployment process 102 may initiate 220 and/or activate the script via a user interface element (not shown), such as a button, menu item, or other user interface element that may be part of the user interface of a third party application, such as configuration management application 108.

As described, the build and deployment architecture 100 may include a configuration management tool, such as configuration management application 108 and/or configuration management service 110. Build and deployment process 102 (alone or in conjunction with the configuration management tool), may store 202 one or more build elements and may generate 204, initiate 206, and deploy 208 computing tasks from within the configuration management tool. Additionally, build and deployment process 102 (alone or in conjunction with the configuration management tool) may manage 222 a version of the at least one build information element via the configuration management tool, and may have the ability to keep track of versions, revisions, and changes to elements and attributes within the configuration management tools. A user, such as user 124, may also use the versioning features of build and deployment process 102 and/or the configuration management tool to capture and track changes to the build information elements stored 202 within the configuration management tool. For example, user 124 may wish to roll back to a prior version of the build and control elements and may utilize the versioning features of build and deployment process 102 and/or the configuration management tool to recall all the build information elements associated with the prior version.

A number of implementations have been described. Nevertheless, it will be understood that various modifications may be made. Accordingly, other implementations are within the scope of the following claims.

What is claimed is:

1. A method of managing computing tasks comprising:
    storing a plurality of attributes of a configuration management tool, wherein the plurality of attributes include a project level attribute, an element level attribute, an environment variable level attribute, and a global level attribute, wherein the project level attribute is associated with a specific project within the configuration management tool and defines a project level scope that affects the specific project within the configuration management tool, the environment level attribute is associated with the operating system of the computing environment, and the global level attribute is associated with all the projects within the configuration management tool and defines a global level scope that affects all projects within the configuration management tool;
    storing at least one build information element within at least one of the plurality of attributes of the configuration management tool, wherein the at least one build information element within the at least one of the plurality of attributes of the configuration management tool includes information about whether to exclude an assembly step as part of a compilation process of a computing task, an option configured to direct a compiler to include debugging information in an output of the compiler, and one or more deployment parameters including one or more instructions used during deployment of the computing task;
    in response to a user input associated with at least one of the plurality of attributes in the configuration management tool, generating automatically the computing task entirely from within the configuration management tool based upon, at least in part, the at least one build information element, wherein generating automatically the computing task includes creating a script that is operative to perform operations including generating the computing task based upon, at least in part, the at least one build information element, and initiating the computing task, wherein the script is configured to read the at least one build information element stored within the configuration management tool and use the at least one build information element to generate the computing task based upon, at least in part, the at least one build information element, wherein the computing task is a multi-platform computing task, and generating the computing task includes generating at least one task for each platform in the multi-platform computing task, the at least one task for each platform being incompatible with at least another platform in the multi-platform computing task;
    generating an installation package to install the computing task on a computing device, wherein the computing device is a remote device;
    initiating the computing task from within the configuration management tool;
    deploying, via a user interface, the computing task on the computing device, wherein the user interface provides the user with a visual representation and an interface of one or more features and one or more functions of the build and deployment method of managing computer tasks;
    executing the computing task on the computing device; and
    controlling a flow of execution of the computing task on the computing device including implementing a break in the execution of the computing task, implementing a pause in the execution of the computing task, and implementing a priority of the execution of the computing task.

2. The method of claim 1 wherein the at least one build information element includes one or more of:
    build parameters;
    software code;
    script code;
    flags;
    deployment parameters;
    meta-data; and
    build commands.

3. The method of claim 1 wherein the computing device includes a mainframe computer.

4. The method of claim 1 wherein the computing task includes build control language.

5. The method of claim 1 further including managing a version of the at least one build information element via the configuration management tool.

6. A computer program residing on a non-transitory computer readable medium having a plurality of instructions stored thereon which, when executed by a processor, cause the processor to perform operations comprising:
    storing a plurality of attributes of a configuration management tool, wherein the plurality of attributes include a project level attribute, an element level attribute, an environment variable level attribute, and a global level attribute, wherein the project level attribute is associated with a specific project within the configuration management tool and defines a project level scope that affects the specific project within the configuration management tool, the environment level attribute is associated with the operating system of the computing environment, and the global level attribute is associated with all the projects within the configuration management tool and defines a global level scope that affects all projects within the configuration management tool;

storing at least one build information element within at least one of the plurality of attributes of the configuration management tool, wherein the at least one build information element within the at least one of the plurality of attributes of the configuration management tool includes information about whether to exclude an assembly step as part of a compilation process of a computing task, an option configured to direct a compiler to include debugging information in an output of the compiler, and one or more deployment parameters including one or more instructions used during deployment of the computing task;

in response to a user input associated with at least one of the plurality of attributes in the configuration management tool, generating automatically the computing task entirely from within the configuration management tool based upon, at least in part, the at least one build information element, wherein generating automatically the computing task includes creating a script that is operative to perform operations including generating the computing task based upon, at least in part, the at least one build information element, and initiating the computing task, wherein the script is configured to read the at least one build information element stored within the configuration management tool and use the at least one build information element to generate the computing task based upon, at least in part, the at least one build information element, wherein the computing task is a multi-platform computing task, and generating the computing task includes generating at least one task for each platform in the multi-platform computing task, the at least one task for each platform being incompatible with at least another platform in the multi-platform computing task;

generating an installation package to install the computing task on a computing device, wherein the computing device is a remote device;

initiating the computing task from within the configuration management tool;

deploying, via a user interface, the computing task on the computing device, wherein the user interface provides the user with a visual representation and an interface of one or more features and one or more functions of the build and deployment method of managing computer tasks;

executing the computing task on the computing device; and controlling a flow of execution of the computing task on the computing device including implementing a break in the execution of the computing task, implementing a pause in the execution of the computing task, and implementing a priority of the execution of the computing task.

7. The computer program product of claim 6 wherein the at least one build information element includes one or more of:
build parameters;
software code;
script code;
flags;
deployment parameters;
meta-data; and
build commands.

8. The computer program product of claim 6 wherein the computing device includes a mainframe computer.

9. The computer program product of claim 6 wherein the computing task includes build control language.

10. The computer program product of claim 6 wherein the operations further include managing a version of the at least one build information element via the configuration management tool.

* * * * *